United States Patent
Yamada

(10) Patent No.: US 9,727,852 B2
(45) Date of Patent: Aug. 8, 2017

(54) CONTROL DEVICE, CONTROL SYSTEM, AND CONTROL METHOD OF A CONTROL DEVICE

(71) Applicant: Seiko Epson Corporation, Tokyo (JP)

(72) Inventor: Yusuke Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/015,839

(22) Filed: Feb. 4, 2016

(65) Prior Publication Data

US 2016/0239819 A1    Aug. 18, 2016

(30) Foreign Application Priority Data

Feb. 12, 2015   (JP) .................. 2015-025031

(51) Int. Cl.
*G06Q 20/20* (2012.01)
*G06F 3/12* (2006.01)

(52) U.S. Cl.
CPC ......... *G06Q 20/209* (2013.01); *G06F 3/1204* (2013.01); *G06F 3/1206* (2013.01); *G06F 3/1244* (2013.01); *G06F 3/1288* (2013.01); *G06F 3/1292* (2013.01)

(58) Field of Classification Search
USPC ........................................... 358/1.13
See application file for complete search history.

(56) References Cited

U.S. PATENT DOCUMENTS

| | | | |
|---|---|---|---|
| 2014/0049790 A1* | 2/2014 | Nakamura | G06F 3/1298 358/1.13 |
| 2014/0092415 A1 | 4/2014 | Yokoyama | |
| 2014/0211255 A1* | 7/2014 | Takasu | G06F 3/1204 358/1.15 |

FOREIGN PATENT DOCUMENTS

JP       2014-071647 A     4/2014

\* cited by examiner

*Primary Examiner* — Ngon Nguyen
(74) *Attorney, Agent, or Firm* — Foley & Lardner LLP

(57) ABSTRACT

A tablet terminal 13 has a tablet terminal controller 20 that returns a substitute address indicating the address of the tablet terminal 13 to the POS terminal 10 when a command asking for the address of the recording device 12 is received from the POS terminal 10; determines whether to send the received print control data to the recording device or the management device, or to both, as the destination device if print control data transmitted by the POS terminal 10 to the substitute address is received; and transmits the print control data to the selected destination.

20 Claims, 7 Drawing Sheets

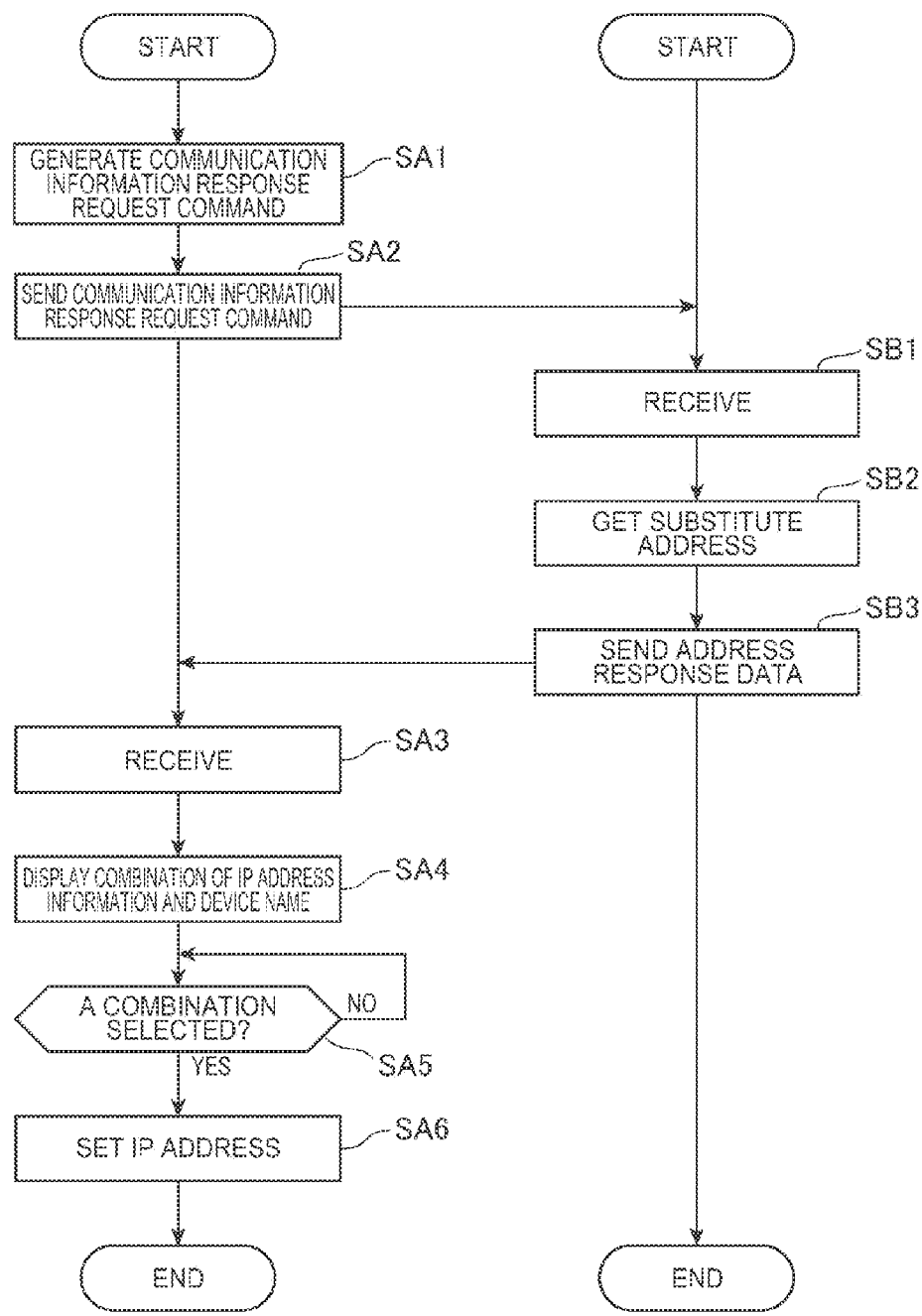

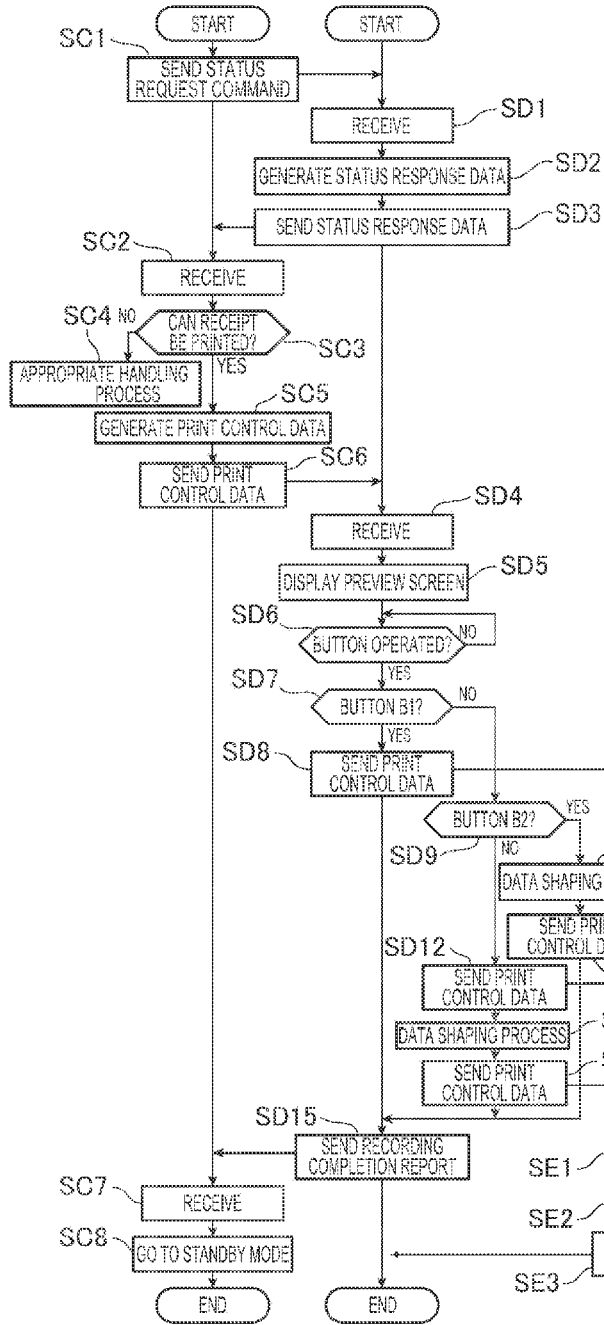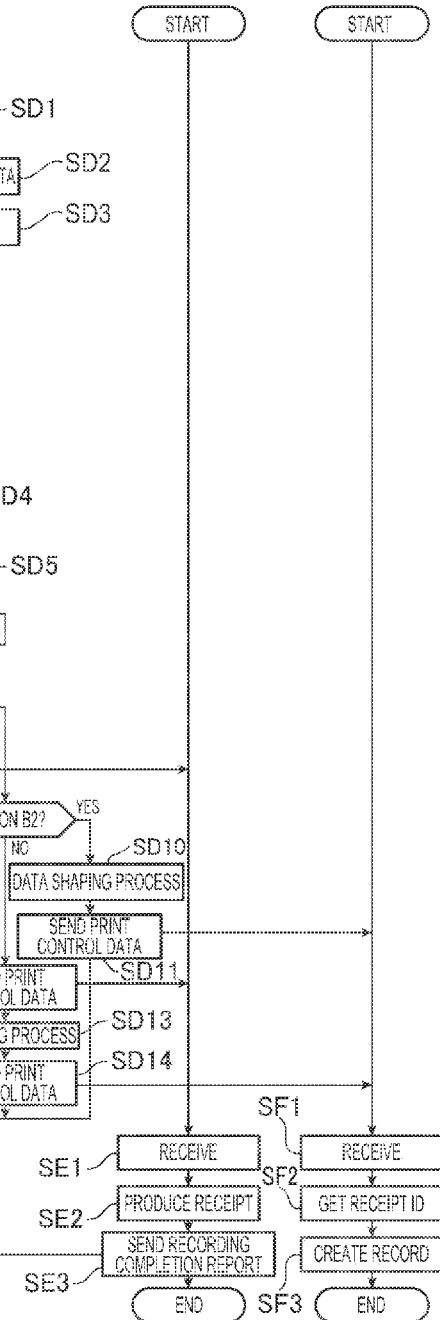

CONTROL DEVICE, CONTROL SYSTEM, AND CONTROL METHOD OF A CONTROL DEVICE

Priority is claimed under 35 U.S.C. §119 to Japanese Application No. 2015-025031, filed Feb. 12, 2015, which is hereby incorporated by reference in its entirety.

BACKGROUND

1. Technical Field

The present disclosure relates to a control device, a control system, and a control method of a control device.

2. Related Art

Print control devices that receive print control data (receipt data) from a POS terminal, and send the received receipt data to a management device (management server) connected through a network, are known from the literature. See, for example, JP-A-2014-71647. The management device runs a specific process, such as producing an electronic receipt (web receipt), based on the received print control data.

POS systems in which a POS terminal is connected to a recording device, the POS terminal sends print control data to the recording device, and the recording device produces a receipt based on the print control data are common. If the print control data can be sent to a management device as needed in such a POS system, services based on the print control data can be provided by the management device and help to improve customer satisfaction. When adding such a capability to an existing system, however, it is desirable to minimize changes to the existing system due to cost and work productivity considerations.

SUMMARY

The present disclosure enables a POS terminal to send print control data to a management device as required while minimizing modification of an existing system having a POS terminal and recording device.

A control device according to one aspect of the disclosure has: a user interface configured to receive command input; a first communication interface configured to communicate with a recording device that is configured to produce a receipt based on print control data from a POS terminal; a second communication interface configured to communicate through a global network with a management device that executes a specific process based on the print control data; a third communication interface configured to communicate with the POS terminal through a local area network and receive the print control data; and a controller configured to control the control device based on a command sent from the POS terminal to the third communication interface. The controller returns a substitute address indicating an address of the control device to the POS terminal if the third communication interface receives a command requesting an address of the recording device from the POS terminal; determines to send the received print control data from the first communication interface to the recording device or from the second communication interface to the management device based on the command input, which selects a destination of the print control data, if the third communication interface receives the print control data from the POS terminal to the substitute address; and transmits the print control data to the selected destination.

Thus comprised, while minimizing modification of a system having a POS terminal and a recording device, print control data transmitted by the POS terminal can be sent to a management device as required.

This configuration enables the user to change the destination of the print control data to the desired device.

A control device according to the disclosure further comprises a display configured to display images, the controller displaying an image of the receipt to be printed based on the print control data on the display when the print control data is received from the POS terminal. The user can also determine the destination of the print control data after confirming the content of the receipt.

A control device according to another aspect of the disclosure also has a storage configured to store information related to the recording device. The controller converts the print control data to converted print control data that is configured to be processed by the management device based on information related to the recording device if the print control data is sent to the management device and the print control data is not data that is configured to be processed by the management device, and sends the converted print control data to the management device.

Thus comprised, when print control data is sent to the management device, the management device can be assured of being able to process the received print control data.

In a control device according to another aspect of the disclosure, the controller communicates with the recording device and manages a status of the recording device, and returns the status of the recording device based on a status of the managed recording device if the third communication interface receives a command sent by the POS terminal to the substitute address requesting the status of the recording device.

Thus comprised, the POS terminal can quickly acquire the status of the recording device.

In a control device according to another aspect of the disclosure, if the controller sends the print control data to the management device, and receives a request from the management device to produce a coupon after sending the print control data to the management device, the controller controls the recording device to print a coupon.

Thus comprised, a function of the management device can be used to issue a coupon appropriate to the transaction.

In a control device according to another aspect of the disclosure, after receiving the print control data, the controller reports to the POS terminal that printing a receipt based on the print control data was completed whether or not the print control data was sent to the recording device.

Thus comprised, changes to the POS terminal can be minimized when changing an existing system.

Another aspect of the disclosure is a control system including: a POS terminal configured to execute a transaction process; a recording device configured to produce a receipt based on print control data from a POS terminal; a management device configured to execute a specific process based on the print control data; and a control device configured to communicate with the POS terminal, the recording device, and the management device. The control device includes a user interface configured to receive command input; a first communication interface configured to communicate with the recording device; a second communication interface configured to communicate through a global network with the management device; a third communication interface configured to communicate with the POS terminal through a local area network; and a controller configured to execute control based on a command sent from the POS terminal and received by the third communication interface. The controller returns a substitute address indicating an address of the control device to the POS terminal if the third communication interface receives a command requesting an address of the recording device from the POS terminal; determines to send the received print control data from the first communication interface to the recording device or from the second communication interface to the management device, based on the command input, which selects a destination of the print control data, if the third communication interface receives the print control data from the POS terminal to the substitute address; and transmits the print control data to the selected destination.

This aspect of the disclosure enables sending print control data output by the POS terminal to a management device as required while minimizing the changes to an existing system having a POS terminal and a recording device.

Another aspect of the disclosure is a control method of a control device, the control method including: returning a substitute address indicating an address of the control device to the POS terminal if the control device receives a command requesting an address of a recording device that is configured to produce a receipt based on print control data from the POS terminal through a LAN; determining to send the received print control data to the recording device or a management device, which communicates through a global network and executes a specific process based on the print control data, based on a command input, which selects a destination of the print control data, if the control device receives the print control data transmitted by the POS terminal to the substitute address; and transmitting the print control data to the selected destination.

This aspect of the disclosure enables sending print control data output by the POS terminal to a management device as required while minimizing the changes to an existing system having a POS terminal and a recording device.

Other objects and attainments together with a fuller understanding of the disclosure will become apparent and appreciated by referring to the following description and claims taken in conjunction with the accompanying drawings.

BRIEF DESCRIPTION OF THE DRAWINGS

FIGS. 3(A) and 3(B) are flow charts of the operation of the POS terminal and a tablet terminal.

FIGS. 4(A)-4(D) are flow charts of the operation of devices in the control system.

DESCRIPTION OF EMBODIMENTS

A preferred embodiment of the present disclosure is described below with reference to the accompanying figures.

Figure 1:
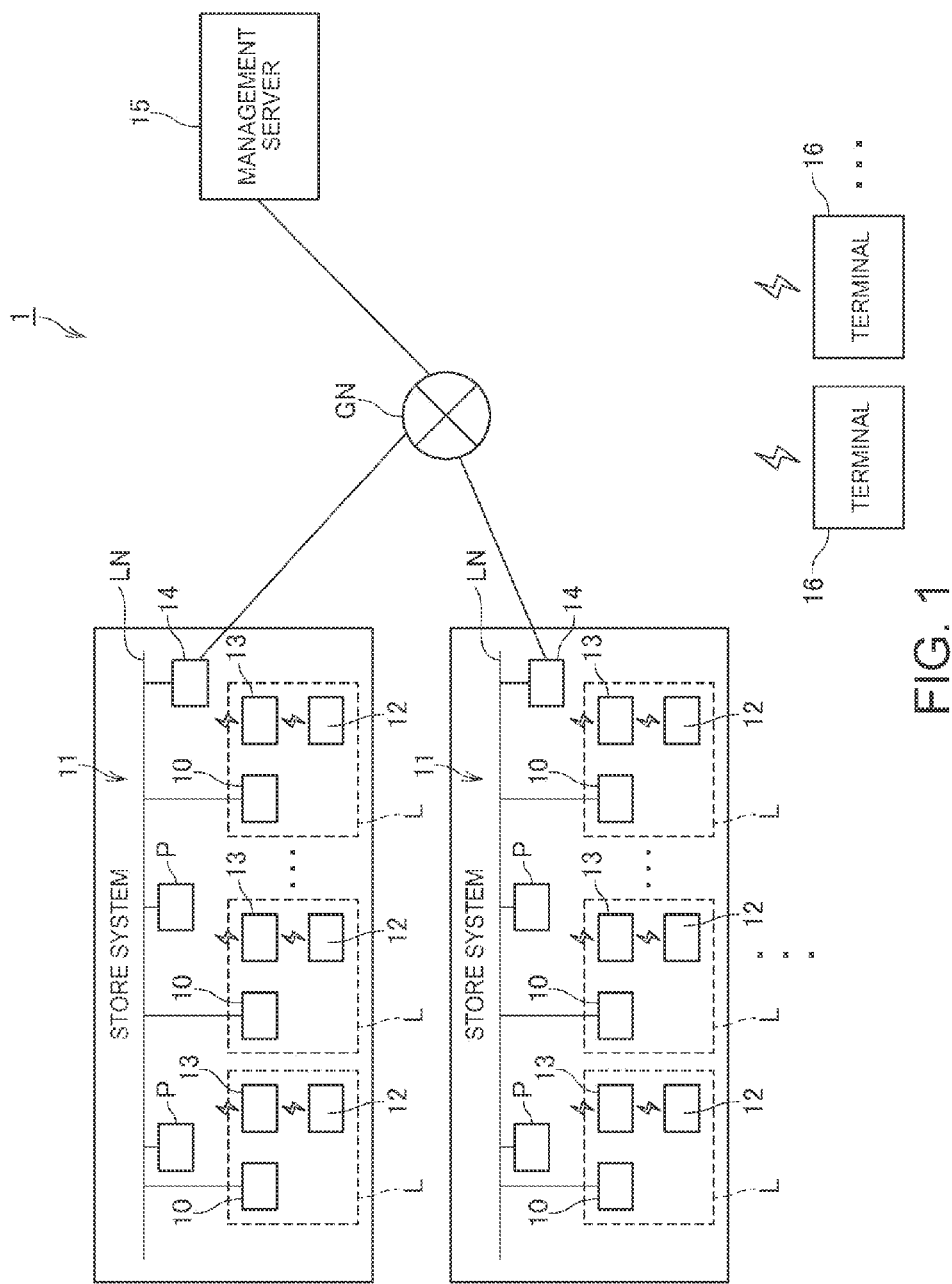
FIG. 1 illustrates the configuration of a control system according to the disclosure.

FIG. 1 shows the configuration of a control system 1 according to a preferred embodiment of the disclosure.

As shown in FIG. 1, the control system 1 includes a plurality of store systems 11. A store system 11 is a system that is used in retail businesses such as supermarkets, convenience stores, department stores, and restaurants.

The store system 11 has functions for processing transactions according to the products purchased by customers, and producing sales (transaction) receipts based on the transactions.

One or more checkout counters L where customer transactions are processed are located in the business where the store system 11 is deployed. A POS system S including a POS terminal 10, a tablet terminal 13 (control device), and a recording device 12 (processing device) are installed at each checkout counter L.

The POS terminal 10 is connected by wire to the local area network LN of the store system 11. The tablet terminal 13 is connected to the local area network LN through an access point P. The POS terminal 10 and tablet terminal 13 communicate through the access point P according to a communication protocol for a LAN compatible with an infrastructure mode.

The tablet terminal 13 and recording device 12 communicate directly wirelessly by a near-field communication standard such as Bluetooth®, or a wireless LAN standard compatible with an ad hoc mode.

The operation of the devices in the POS system S during a transaction at the checkout counter L is described further below.

A communication device 14 is also connected to the local area network LN. The communication device 14 is an interface device that connects to the local area network LN and a global network GN (network) such as the Internet. The communication device 14 has the functions of a modem (or ONU (Optical Network Unit)), a router, a DHCP (Dynamic Host Configuration Protocol) server, and a NAT (Network Address Translation) unit. The communication device 14 passes data between devices when a device connected to the local area network LN and a device connected to the global network GN communicate with each other. Note that the communication device 14 is represented by a single function block in FIG. 1, but the communication device 14 may comprise plural devices with different functions.

The tablet terminal 13 can also access the global network GN through the communication device 14.

A management server 15 (control device) connects to the global network GN. The management server 15 is a cloud server in a cloud system in which the tablet terminal 13 is a client. More specifically, when triggered by a request from the tablet terminal 13 as a client device, for example, the management server 15 runs a specific operating process. The management server 15 then sends data based on the result of the process to the client tablet terminal 13 as needed. Note that the management server 15 is represented by a single function block in FIG. 1, but this does not mean that the management server 15 is embodied by a single server device. For example, the management server 15 may include a plurality of server devices. More specifically, the management server 15 may be configured in any way enabling executing the processes described below.

A terminal 16 also connects to the global network GN. The terminal 16 in this example is the tablet-type cell phone (a smartphone) of a customer in the store. The terminal 16 may, however, be any terminal device that can execute the processes described below. For example, a tablet computer may also be used as a terminal 16.

Figure 2:
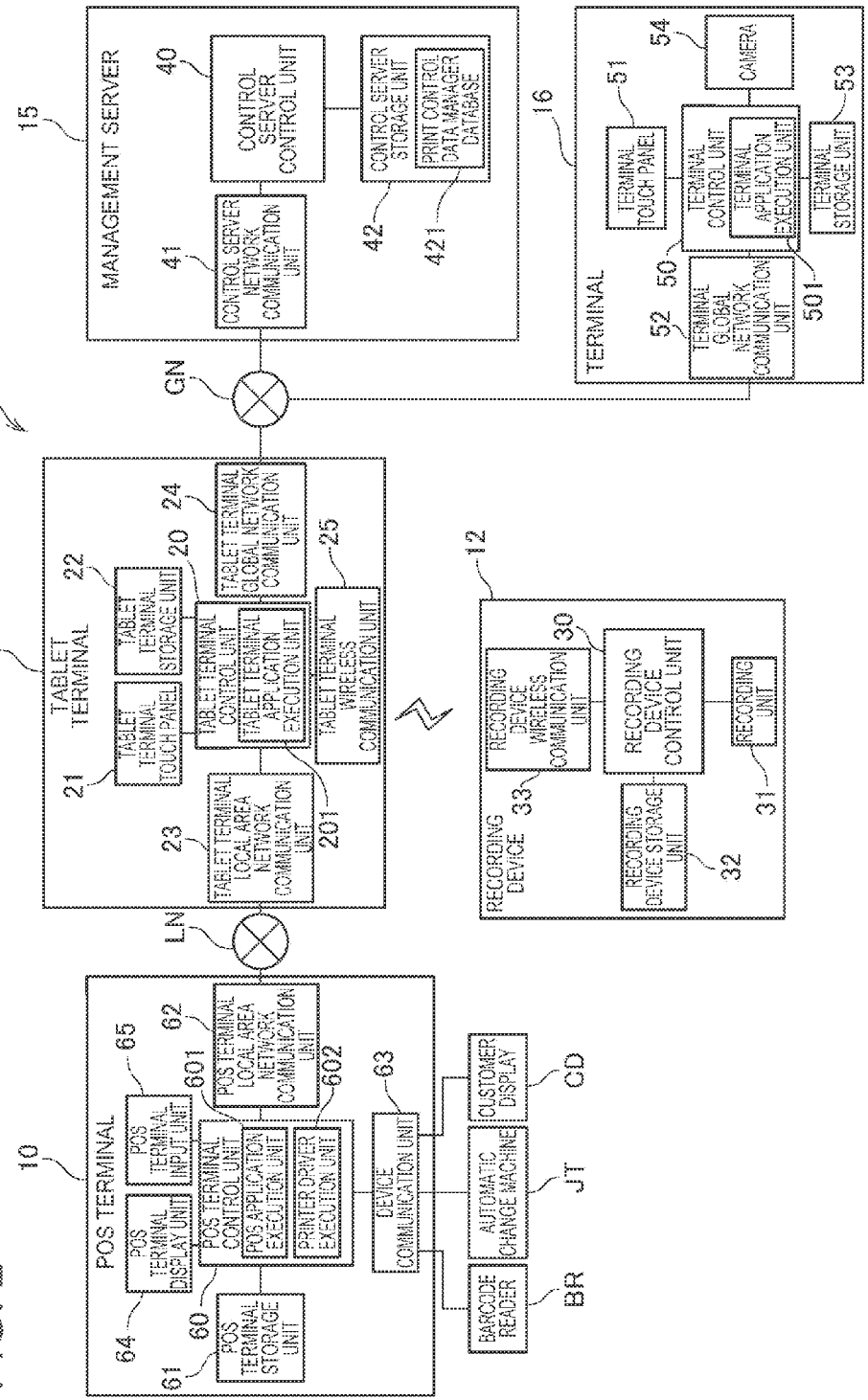
FIG. 2 is a block diagram illustrating the functional configuration of devices in the control system.

FIG. 2 is a block diagram illustrating the functional configuration of devices in the control system 1.

The POS terminal 10 is a host computer that runs transaction-related processes based on customer transactions at the checkout counter L.

As shown in FIG. 2, the POS terminal 10 includes a POS terminal controller 60, POS terminal storage 61, POS terminal local area network communication interface 62, device communication interface 63, POS terminal display 64, and POS terminal input unit 65.

The POS terminal controller 60 includes a CPU, ROM, RAM, and other peripheral circuits, and controls the POS terminal 10. A POS application and a printer driver for controlling the recording device 12 are installed on the POS terminal 10. The POS terminal controller 60 functions as a POS application execution unit 601 by the CPU reading and running the POS application and associated programs. The POS terminal controller 60 also functions as a printer driver execution unit 602 by the CPU reading and running an installed printer driver and associated programs. The functions and processes based on the functions of the POS application execution unit 601 and printer driver execution unit 602 are described below.

The POS terminal storage 61 has nonvolatile memory and stores data.

The POS terminal local area network communication interface 62 communicates according to a specific communication protocol with devices that connect to the local area network LN (including the tablet terminal 13) as controlled by the POS terminal controller 60.

The device communication interface 63 has an interface board with a USB port and a port conforming to a non-USB serial communication standard. Devices can connect to each port. The device communication interface 63 communicates with devices connected to the POS terminal 10 through the corresponding port as controlled by the POS terminal controller 60.

Note that the device communication interface 63 may also have a wireless communication capability and communicate with devices wirelessly.

The POS terminal display 64 has an LCD panel or other type of display panel, and displays information as controlled by the POS terminal controller 60.

The POS terminal input unit 65 has input means such as a keyboard with a keypad and operating switches, detects input to the input means, and outputs to the POS terminal controller 60. Based on input from the POS terminal input unit 65, the POS terminal controller 60 executes processes appropriate to the input to the input means.

A barcode reader BR, customer display CD, and an automatic change machine JT are examples of devices that connect to the POS terminal 10 in this example.

The barcode reader BR is used to read barcodes from products and product packaging, and outputs data representing the barcode to the device communication interface 63. The device communication interface 63 then outputs the data input from the barcode reader BR to the POS terminal controller 60.

The customer display CD displays transaction-related information as controlled by the POS terminal controller 60. The information presented on the customer display CD can be checked by the customer involved in the transaction at the checkout counter L.

The automatic change machine JT has openings for receiving cash and openings for dispensing change. When cash is input through the cash receiver, the change due is dispensed from the cash return openings as controlled by the recording device controller 30.

The tablet terminal 13 is a tablet computer including a user interface, which may be a tablet terminal touch panel 21, which is a touch panel covering a large area of the display surface.

As shown in FIG. 2, the tablet terminal 13 includes a tablet terminal controller 20 (controller), tablet terminal touch panel 21, tablet terminal storage 22 (storage), tablet terminal local area network communication interface 23 (third communication interface), tablet terminal global network communication interface 24 (second communication interface), and tablet terminal wireless communication interface 25 (first communication interface).

The tablet terminal controller 20 includes a CPU, ROM, RAM, and other peripheral circuits, and controls the tablet terminal 13. A specific application ("tablet terminal application TAP" below) is preinstalled on the tablet terminal 13. The tablet terminal controller 20 functions as a tablet terminal application execution unit 201 by reading and running the tablet terminal application TAP and associated programs.

The tablet terminal touch panel 21 combines an LCD panel or other type of display panel with a touch sensor overlaid to the display panel. The display panel displays images as controlled by the tablet terminal controller 20. The touch sensor detects touch operations and outputs to the tablet terminal controller 20. The tablet terminal controller 20 then executes processes appropriate to the touch operation based on input from the touch sensor.

The tablet terminal touch panel 21 in this example is an input unit that accepts user input, and a display that displays images.

The tablet terminal storage 22 is nonvolatile memory and stores data.

The tablet terminal local area network communication interface 23 communicates with devices (including the POS terminal 10) connected to the local area network LN according to a specific communication protocol as controlled by the tablet terminal controller 20.

The tablet terminal global network communication interface 24 communicates with devices (including the management server 15) connected to the global network GN according to a specific communication protocol as controlled by the tablet terminal controller 20.

The tablet terminal wireless communication interface 25 communicates according to a specific wireless communication protocol with the recording device 12 as controlled by the tablet terminal controller 20.

The recording device 12 is a thermal line printer that holds roll paper and forms dots on the stored roll paper with a line thermal head to record images.

As shown in FIG. 2, the recording device 12 has a recording device controller 30, a recording unit 31, a recording device storage 32, and a recording device wireless communication interface 33.

The recording device controller 30 includes a CPU, ROM, RAM, and other peripheral circuits, and controls the recording device 12.

The recording unit 31 includes mechanisms related to recording on roll paper, such as a conveyance mechanism for conveying roll paper stored inside the cabinet of the recording device 12, a recording mechanism for forming dots and recording images on the roll paper with a thermal head, and a cutter mechanism for cutting the roll paper at a specific position. As described below, the recording device 12 produces a receipt or a coupon in specific circumstances. The recording unit 31 conveys the roll paper with the conveyance mechanism, records receipt-related images on the roll paper with the recording mechanism, and cuts the roll paper at a specific position by the cutter mechanism as controlled by the recording device controller 30 to produce a receipt or a coupon.

The recording device storage 32 has nonvolatile memory and stores data.

The recording device wireless communication interface 33 communicates with the tablet terminal 13 according to a specific wireless communication protocol as controlled by the recording device controller 30.

The management server 15 is a cloud server to which the tablet terminal 13 connects as a client.

As shown in FIG. 2, the management server 15 includes a management server controller 40, management server global network communication interface 41, and management server storage 42.

The management server controller 40 includes a CPU, ROM, RAM, and other peripheral circuits, and controls the management server 15.

The management server global network communication interface 41 communicates with devices connected to the global network GN (including tablet terminals 13) according to a specific communication protocol as controlled by the management server controller 40.

The management server storage 42 includes nonvolatile memory, and stores data.

The terminal 16 is a tablet-type cell phone (smartphone) belonging to a customer completing a transaction in the store.

As shown in FIG. 2, the terminal 16 has a terminal controller 50, a terminal touch panel 51, a terminal global network communication interface 52, a terminal storage 53, and a camera 54.

The terminal controller 50 includes a CPU, ROM, RAM, and other peripheral circuits, and controls the terminal 16. A specific application (referred to below as the terminal application AP) is previously installed to the terminal 16. The terminal controller 50 functions as a terminal application execution unit 501 by reading and executing the terminal application AP and other associated programs.

The terminal touch panel 51 includes a display panel on the front of the terminal 16, and a touch sensor disposed over the display panel.

The terminal global network communication interface 52 communicates through the global network GN with other devices (including the management server 15) connected to the network according to a specific communication protocol as controlled by the terminal controller 50.

The terminal storage 53 has nonvolatile memory, and stores data.

The camera 54 includes an imaging element such as a CCD image sensor or a CMOS image sensor, a photographic lens group, and a lens drive unit that drives the photographic lens group to adjust the zoom or focus, for example, and is used to take pictures. The camera 54 generates picture image data from the captured image, and outputs to the terminal controller 50.

As described above, checkout counters L are installed in the store where the store system 11 is used. Conventionally, a POS terminal 10 and recording device 12 are installed at each checkout counter L. An existing system comprising a POS terminal 10 and recording device 12 is referred to below as the existing POS system. In the existing POS system, the POS terminal 10 runs a transaction process according to the customer transaction at the checkout counter L, and controls the recording device 12 to produce a receipt recording information related to the transaction.

A POS system S of the store system 11 according to this embodiment also has a tablet terminal 13 at each checkout counter L, enables the management server 15 to issue an electronic receipt for the customer through a function of the tablet terminal 13, and thereby improves customer satisfaction.

By devices of the POS system S executing the processes described below when converting an existing POS system to the POS system S according to this embodiment, modification (such as program changes) of the devices in the existing POS system to convert the existing POS system is minimized, and the existing POS system can be easily changed to the POS system S of the disclosure.

The operation of devices in the POS system S when converting an existing POS system to the POS system S of the disclosure is described below.

Operation of the Tablet Terminal 13 and Recording Device 12

The tablet terminal 13 and recording device 12 perform the operations described below to change an existing POS system to the POS system S according to this embodiment.

First, the tablet terminal 13 and recording device 12 connect and open a direct 1:1 wireless data communication link therebetween. As described above, any suitable communication protocol may be used for communication between the tablet terminal 13 and recording device 12, including near-field communication using Bluetooth®, or a communication standard for a wireless LAN in an ad hoc mode.

Next, the communication by the recording device 12 with external devices other than the tablet terminal 13 through the local area network LN is turned off.

Operation of the POS Terminal 10 and Tablet Terminal 13

FIG. 3 is a flowchart showing the operation of the POS terminal 10 an tablet terminal 13 when changing from the existing POS system to the POS systems, column (A) showing the operation of the POS terminal 10, and (B) showing the operation of the tablet terminal 13.

As will be understood below, by executing the processes in the flowchart shown in FIG. 3 (A), the POS terminal 10 gets the IP address of the device to which the print control data (described below) instructing printing a receipt should be sent, and sets this IP address as the destination IP address.

In the existing POS system, the POS terminal 10 gets the IP address of the recording device 12 as the IP address of the device to which to send the print control data, and when sending print control data, sends the print control data to the IP address of the recording device 12 as the address of the destination recording device 12.

To change an existing POS system to the POS system S according to this embodiment, the POS terminal 10 gets the IP address of the tablet terminal 13 as the destination IP address to which to send the print control data as a result of the tablet terminal 13 executing the following process. When transmitting print control data in the transaction process, the POS terminal 10 then sends the data to the IP address of the tablet terminal 13 as the destination.

When the process shown in FIG. 3 (B) starts, the tablet terminal application TAP of the tablet terminal 13 is already running.

As shown in FIG. 3 (A), the printer driver execution unit 602 of the POS terminal controller 60 of the POS terminal 10 generates a communication information response request command (step SA1). A communication information response request command is a command requesting any device that is compatible with the command language of commands transmitted by the POS terminal 10 (that is, any device that can process commands sent by the POS terminal 10) to send (return) its IP address.

A communication information response request command is equivalent to a command asking for the address of the recording device 12.

In step SA1, the printer driver execution unit 602 broadcasts the communication information response request command to the devices connected to the same local area network LN as the POS terminal 10.

Each device connected to the local area network LN that can process commands transmitted by the POS terminal 10 then returns its own IP address to the POS terminal 10 when the communication information response request command is received.

When a device connected to the local area network LN that cannot process commands transmitted by the POS terminal 10 receives a communication information response request command, the device simply discards the received command.

The printer driver execution unit 602 can get the IP address of each device connected to the local area network LN that can process commands sent by the printer driver execution unit 602 from the responses to the communication information response request command.

Note that the recording device 12 also has a function for returning its own IP address when it receives a communication information response request command. However, because the function of the recording device 12 for communicating with external devices connected to the local area network LN was previously turned off as described above, the recording device 12 does not respond to the communication information response request command transmitted by the POS terminal 10 in step SA1 even if the recording device 12 has a wireless communication function compatible with the communication protocol of the wireless LAN.

The printer driver execution unit 602 executes the process of step SA1 when triggered by user input to a specific user interface provided by a function of the printer driver.

After generating the communication information response request command, the printer driver execution unit 602 controls the POS terminal local area network communication interface 62 to broadcast the generated communication information response request command to all devices connected to the local area network LN (step SA2).

The tablet terminal 13 connects to the local area network LN. As a result, the communication information response request command transmitted by the printer driver execution unit 602 in step SA2 is received by the tablet terminal 13.

As shown in FIG. 3 (B), the tablet terminal application execution unit 201 of the tablet terminal controller 20 of the tablet terminal 13 controls the tablet terminal local area network communication interface 23 to receive the communication information response request command transmitted by the POS terminal 10 in step SA2 (step SB1).

Next, the tablet terminal application execution unit 201 executes the following process by reading and running the received communication information response request command (step SB2).

More specifically, the tablet terminal application execution unit 201 gets the IP address of the tablet terminal 13 (referred to below as the substitute address) (step SB2).

Next, the tablet terminal application execution unit 201 controls the tablet terminal local area network communication interface 23 to send the substitute address information and data (referred to below as "address response data") of a specific format including information indicating the name of the tablet terminal 13 to the POS terminal 10 (step SB3).

The name of the tablet terminal 13 is previously registered and stored in a storage area that can be referenced by the tablet terminal application execution unit 201.

The process of step SB3 is equivalent to a process that returns the substitute address.

As shown in FIG. 3 (A), the printer driver execution unit 602 of the POS terminal controller 60 of the POS terminal 10 controls the POS terminal local area network communication interface 62 to receive the substitute address sent by the tablet terminal 13 in step SB3 (step SA3).

While not shown in FIG. 3 (A), in response to transmission of the communication information response request command, the printer driver execution unit 602 receives address response data including information identifying the IP address of the device and information indicating the name of the device from the POS terminal 10 and any other device that is connected to the local area network LN and can process the command.

Next, the printer driver execution unit 602 controls the POS terminal display 64 based on the received address response data (if address response data is received from plural devices, the address response data for each device) to display the combination of IP address information and the device name information (plural combinations if address response data is received from plural devices) on the display panel (step SA4).

In step SA4, one of the combinations of IP address information and device name information displayed on the display panel is uniquely selected by input to the input means of the POS terminal input unit 65.

The combination of the IP address information (substitute address) of the tablet terminal 13 and the device name of the tablet terminal 13 is included in the combinations of IP address information and device name information displayed on the display panel in step SA4.

The printer driver execution unit 602 then checks which combination of IP address information and device name information displayed on the display panel is selected (step SA5).

When changing the existing POS system to the POS system S, the user selects the combination of the IP address information (substitute address) of the tablet terminal 13 and the device name of the tablet terminal 13. The process executed by the POS terminal 10 when the user selects the combination of the IP address information (substitute address) of the tablet terminal 13 and the device name of the tablet terminal 13 is described below.

When one combination of IP address information and device name information displayed on the display panel is selected, the printer driver execution unit 602 sets the IP address in the selected combination as the IP address of the device to which to send commands, including the print control data (described below) instructing producing a receipt (step SA6). In this example, the IP address (substitute address) of the tablet terminal 13 is set by the process of step SA6 as the destination IP address of the device to which to send commands including the print control data.

When commands for controlling the recording device 12, including print control data, are generated after step SA6 ends, the printer driver execution unit 602 sends the generated commands and data to the substitute address set in step SA6.

The operation of devices in the POS system S when converting an existing POS system to the POS system S is described above.

The user can therefore convert an existing POS system to the POS system S of the disclosure by changing the communication connections between devices in the existing POS system to the communication connections between devices in the POS system S through the simple operation described above. In the existing POS system, the POS terminal 10 communicates directly with the recording device 12 through a 1:1 connection. In the POS system S according to the disclosure, the POS terminal 10 communicates with the tablet terminal 13, and the tablet terminal 13 communicates with the recording device 12.

There is also no need to modify the POS terminal 10 and recording device 12 programs in order to convert an existing POS system to the POS system S of the disclosure. More specifically, the POS terminal 10 continues to execute the same processes after the system is changed as before the system was changed, and commands of the same content as the commands transmitted before the system changed are simply sent to the new IP address (substitute address) that was set. The recording device 12 also executes the same processes after the system is changed as before the system changed.

In other words, to convert an existing POS system to the POS system S of the disclosure, the user does not need to modify the POS terminal 10 or recording device 12, communication between devices in the system can be changed by a simple operation, and the work load on the user needed to change the system is small.

The operation of the POS terminal 10, tablet terminal 13, recording device 12, and management server 15 when a customer transaction is processed at the checkout counter L is described next.

FIG. 4 is a flow chart of the operation of the POS terminal 10, tablet terminal 13, recording device 12, and management server 15 when a customer transaction is processed at the checkout counter L, column (A) showing the operation of the POS terminal 10, (B) showing the operation of the tablet terminal 13, (C) showing the operation of the recording device 12, and (D) showing the operation of the management server 15.

A customer transaction is completed at the checkout counter L before the operation described by the flow chart starts in FIG. 4 (A). During the transaction, the checkout clerk reads barcodes with the barcode reader BR and inputs transaction related information to the input means of the POS terminal input unit 65. The POS application execution unit 601 of the POS terminal controller 60 of the POS terminal 10 executes a transaction process based on the results of reading barcodes with the barcode reader BR and data input by the checkout clerk, and controls the customer display CD and automatic change machine JT appropriately.

When the transaction is completed, the POS application execution unit 601 outputs transaction-related information to the printer driver execution unit 602.

As shown in FIG. 4 (A), when completion of a transaction is reported, the printer driver execution unit 602 generates a status request command (a command requesting the recording device 12 to return a status report), and controls the POS terminal local area network communication interface 62 to send the generated status request command to the tablet terminal 13 using the substitute address (the IP address of the tablet terminal 13) (step SC1).

A status request command is a command requesting the recording device 12 to report its current status.

To print a receipt from the recording device 12 after a transaction is confirmed in the existing POS system, the POS terminal 10 first sends a status request command to the recording device 12 and determines if the recording device 12 can print a receipt based on the response to the request.

More specifically, the process of step SC1 is executed by an existing function of the POS terminal 10.

As shown in FIG. 4 (B), the tablet terminal application execution unit 201 of the tablet terminal controller 20 of the tablet terminal 13 controls the tablet terminal local area network communication interface 23 to receive the status request command (step SD1).

Next, the tablet terminal application execution unit 201 generates status response data based on the status request command (step SD2).

The process of step SD2 is described below.

The tablet terminal application execution unit 201 also has the following function. That is, the tablet terminal application execution unit 201 has a function for managing the status of the recording device 12.

The status of the recording device 12 refers to any state of the recording device 12 that may affect recording images on the roll paper, for example, the state (open or closed) of a cover of the recording device 12, if an error has occurred, and the status of roll paper (normal, near-end, no paper).

More specifically, when the power turns on, the recording device controller 30 of the recording device 12 gets the status of the recording device 12, and sends data indicating the recording device 12 status (referred to below as status data) to the tablet terminal 13. The tablet terminal application execution unit 201 of the tablet terminal 13 then stores the received status data in a specific storage area.

Thereafter while the power remains on, the recording device controller 30 of the recording device 12 monitors whether or not there is a change in the status of the recording device 12. If a change in the status of the recording device 12 is detected, the recording device 12 sends status data identifying the new status to the tablet terminal 13. The tablet terminal application execution unit 201 of the tablet terminal 13 then overwrites the status data stored in the specific storage area with the received status data.

The tablet terminal application execution unit 201 thus manages the status of the recording device 12 by thus storing status data representing the latest status of the recording device 12 in a specific storage area.

Note that the method used by the tablet terminal application execution unit 201 to manage the status of the recording device 12 is not limited to the above example. For example, the tablet terminal application execution unit 201 may regularly request a recording device 12 status report from the recording device 12, and manage the recording device 12 status based on the response to the request.

In step SD2, the tablet terminal application execution unit 201 gets the status data stored in the specific storage area based on the status request command. The status data acquired in this step is data indicating the most recent state of the recording device 12.

Next, based on the acquired status data, the tablet terminal application execution unit 201 generates status response data, which is data in a specific format including information identifying the state of the recording device 12.

After generating the status response data, the tablet terminal application execution unit 201 controls the tablet terminal local area network communication interface 23 to send the generated status response data to the POS terminal 10 (step SD3).

The tablet terminal 13 according to this embodiment manages the state of the recording device 12 as described above. When a request for the status of the recording device 12 is received from the POS terminal 10 before the POS terminal 10 sends the print control data (described below), the tablet terminal 13 returns the status of the recording device 12 instead of the recording device 12. This has the following effect.

That is, the tablet terminal 13 can return the status of the recording device 12 to the POS terminal 10 more quickly when a status request command is received than when the tablet terminal 13 queries the status of the recording device 12, acquires the status of the recording device 12 based on the response to the query, and then generates status response data based on the acquired recording device 12 status. More specifically, the status of the recording device 12 can be returned in the same time required to respond in the existing POS system.

As shown in FIG. 4 (A), the printer driver execution unit 602 of the POS terminal controller 60 of the POS terminal 10 controls the POS terminal local area network communication interface 62 to receive the status response data (step SC2).

Next, the printer driver execution unit 602 determines, based on the received status response data, if the recording device 12 can produce a receipt (step SC3). For example, if a cover is open, there is no roll paper, or an error is reported, the printer driver execution unit 602 determines that the recording device 12 cannot produce a receipt.

If the recording device 12 cannot print a receipt (step SC3: NO), the printer driver execution unit 602 executes an appropriate handling process (step SC4).

In this event in step SC4, for example, the printer driver execution unit 602 controls the POS terminal display 64 to display information on the display panel informing the checkout clerk or other user that the recording device 12 cannot produce a receipt. Based on the information displayed on the display panel, the checkout clerk or other user knows that the recording device 12 cannot produce a receipt, and based on this information takes appropriate action with the recording device 12 to return the recording device 12 to a state enabling producing receipts.

If the recording device 12 can produce a receipt (step SC3: YES), the printer driver execution unit 602 generates print control data based on the transaction process executed by the POS application execution unit 601 (step SC5).

More specifically in step SC5, the POS application execution unit 601 generates receipt information based on the result of the transaction process.

The receipt information is the information to record on the receipt produced by the recording device 12. In this embodiment, the receipt information includes a logo, receipt date information, a receipt ID identifying the receipt, information about the products purchased by the customer, subtotal information, tax information, and transaction total information. The POS application execution unit 601 also generates image information including information required for printing images on the receipt, such as receipt information, information related to where to print the receipt information, and information related to decoration (styles) to apply when printing the receipt information, and outputs the image information to the printer driver execution unit 602.

Based on the input image information, the printer driver execution unit 602 generates print control data. The print control data is control data instructing producing a receipt on which the receipt information is recorded according to a specific format, and includes multiple control commands in the command language of the recording device 12.

After generating the print control data in step SC5, the printer driver execution unit 602 controls the POS terminal local area network communication interface 62 to send the generated print control data to the tablet terminal 13 at the substitute address (step SC6).

As shown in FIG. 4 (B), the tablet terminal application execution unit 201 of the tablet terminal controller 20 of the tablet terminal 13 controls the tablet terminal local area network communication interface 23 to receive the print control data (step SD4).

Next, the tablet terminal application execution unit 201 displays a preview screen G1 on the tablet terminal touch panel 21 based on the received print control data (step SD5).

Note that the tablet terminal 13 is installed at the checkout counter L at a position where the customer in the transaction can see images displayed on the tablet terminal touch panel 21, and where the customer in the transaction can touch and operate the tablet terminal touch panel 21.

Figure 5:
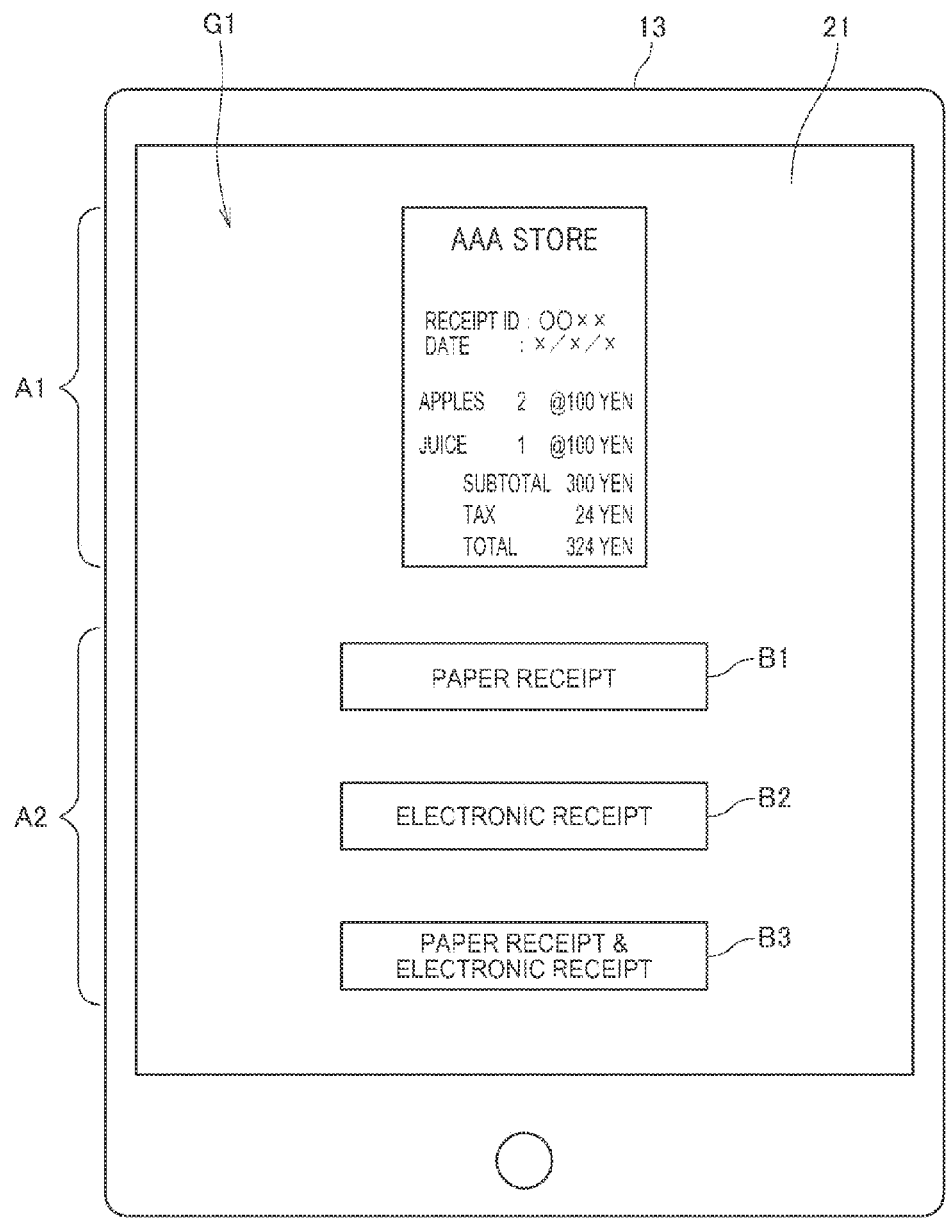
FIG. 5 shows an example of a preview screen.

FIG. 5 shows an example of a preview screen G1.

As shown in FIG. 5, the preview screen G1 has two display areas, area A1 and area A2.

As shown in FIG. 5, an image of the receipt to be printed based on the print control data received in step SD4 is shown in area A1. The tablet terminal application execution unit 201 has a function for analyzing the print control data, generating image data for an image of the printed receipt, and displaying an image of the receipt in area A1 of the preview screen G1.

As shown in FIG. 5, button B1, button B2, and button B3 that can be operated by touch are displayed in area A2.

The customer touches button B1 to receive only a paper receipt, in which case an electronic receipt (described below) is not produced.

The customer touches button B2 to receive only an electronic receipt, in which case a paper receipt is not produced.

The customer touches button B3 to receive both a paper receipt and an electronic receipt.

The customer touches either button B1, button B2, or button B3 after reviewing the image of the receipt displayed in area A1.

After confirming the content of the image to be printed on the receipt, the customer can thus select whether to receive a paper receipt, an electronic receipt, or both a paper receipt and an electronic receipt before a receipt is produced.

After displaying the preview screen G1, the tablet terminal application execution unit 201 determines which of buttons B1 to B3 was pushed (step SD6).

When one of the buttons is touched (step SD6: YES), the tablet terminal application execution unit 201 determines if the button that was operated is button B1 (the button instructing producing a paper receipt) (step SD7).

If button B1 was touched (step SD7: YES), the tablet terminal application execution unit 201 decides to send the print control data to the recording device 12, and controls the tablet terminal wireless communication interface 25 to send the print control data to the recording device 12 (step SD8). Next, the tablet terminal application execution unit 201 goes to step SD15.

If button B1 is not selected (step SD7: NO), the tablet terminal application execution unit 201 determines if the selected button was button B2 (the button instructing producing an electronic receipt) (step SD9).

If button B2 was selected (step SD9: YES), the tablet terminal application execution unit 201 decides to send the print control data to the management server 15, and executes a data shaping process to shape the print control data appropriately (step SD10). The process of step SD10 is described below.

In the data shaping process of step SD10, the tablet terminal application execution unit 201 gets the command language to use in the print control data by acquiring the command language with which the recording device 12 is compatible. Note that the command language of the recording device 12 and the command language of the print control data are the same.

The tablet terminal application execution unit 201 stores information indicating the command language of the recording device 12. For example, the tablet terminal application execution unit 201 may query the recording device 12 at a specific time for the command language of the recording device 12, and based on the response to the query get the command language of the recording device 12 and store information indicating the language. The tablet terminal application execution unit 201 may also prompt the user to input the command language of the recording device 12 through a specific user interface, and store information indicating the command language.

Note that when the command language of the recording device 12 is determined by the model of the recording device 12, the model of the recording device 12 may be acquired by querying the recording device 12 or based on user input to a specific user interface, and then acquire the command language based on the acquired model.

In other words, the tablet terminal application execution unit 201 may acquire the command language of the recording device 12 by any suitable method.

The information identifying the command language of the recording device 12 is a type of information related to the recording device 12.

Next, the tablet terminal application execution unit 201 compares the command language of the print control data based on the command language of the recording device 12 with the command language of the management server 15 (the command system of data that the management server 15 can process).

If the command languages are the same, the tablet terminal application execution unit 201 does not further process the print control data in the data shaping process of step SD10.

If the command languages do not match, the tablet terminal application execution unit 201 converts the print control data to the command language of the management server 15 in step SD10.

The tablet terminal application TAP has a function for converting data in one specific command language to data in the command language used by the management server 15.

After step SD10, the tablet terminal application execution unit 201 controls the tablet terminal global network communication interface 24 to send the print control data (if the print control data was shaped in step SD10, the print control data resulting from step SD10) to the management server 15 identified as the destination of the print control data (step SD11). The tablet terminal application execution unit 201 then goes to step SD15.

Note that the tablet terminal application execution unit 201 manages the information (such as the address of the management server 15 and the communication protocol) required to send the print control data to the management server 15.

If the selected button is not button B2 (step SD9: NO), that is, the selected button is button B3 (the button instructing producing both a paper receipt and an electronic receipt), the tablet terminal application execution unit 201 decides to send the print control data to both the recording device 12 and the management server 15, and proceeds to step SD12.

In this case, the tablet terminal application execution unit 201 controls the tablet terminal wireless communication interface 25 to send the print control data to the recording device 12 (step SD12).

The tablet terminal application execution unit 201 also shapes the data as may be required (step SD13), and controls the tablet terminal global network communication interface 24 to send the print control data to the management server 15 (step SD14). Next, the tablet terminal application execution unit 201 goes to step SD15.

In step SD15, the tablet terminal application execution unit 201 controls the tablet terminal local area network communication interface 23 to send a recording completion report to the POS terminal 10 (step SD15).

A recording completion report is data reporting that the process of producing a receipt based on the print control data is completed.

When producing a receipt based on the print control data is completed in the existing POS system, the recording device 12 generates and sends a recording completion report to the POS terminal 10. The process of step SD15 is equivalent to this process of the existing POS system, and the tablet terminal application execution unit 201 sends the recording completion report to the POS terminal 10 when print control data is received regardless of the destination of the print control data and whether or not producing a receipt based on the print control data is completed.

As shown in FIG. 4 (A), the POS terminal controller 60 of the POS terminal 10 controls the POS terminal local area network communication interface 62 to receive the recording completion report (step SC7).

Next, the POS terminal controller 60 goes to a standby mode based on the received recording completion report (step SC8). This standby mode is a state enabling again executing the process from step SC1 and generating and transmitting print control data based on a new transaction process.

The POS terminal 10 does not go to the standby mode until processing the print control data is completed and the recording completion report is received. Because the tablet terminal 13 is configured to send a recording completion report to the POS terminal 10 when print control data is received regardless of the destination of the print control data in this embodiment of the disclosure, this function of the POS terminal 10 does not need to be changed to convert an existing POS system to the POS system S of the disclosure.

As shown in FIG. 4 (C), the recording device controller 30 of the recording device 12 controls the recording device wireless communication interface 33 to receive the print control data the tablet terminal 13 sent in step SD8 or step SD12 (step SE1).

Next, the recording device controller 30 controls the recording unit 31 to produce a receipt based on the print control data (step SE2). The printed receipt is then given by the checkout clerk to the customer. As a result, a paper receipt can be acquired by touching either button B1 or button B3 in the preview screen G1.

Next, the recording device controller 30 sends the recording completion report to the tablet terminal 13 (step SE3).

While not shown in FIG. 4, the tablet terminal application execution unit 201 of the tablet terminal 13 discards the recording completion report received from the recording device 12. As a result, sending a duplicate recording completion report from the tablet terminal 13 to the POS terminal 10 is prevented.

As shown in FIG. 4 (D), the control server controller 40 of the controls the management server global network communication interface 41 to receive the print control data (the print control data after data shaping if the print control data was processed in the data shaping process) sent by the tablet terminal 13 in step SD11 or step SD14 (step SF1).

Next, the management server controller 40 analyzes the received print control data to extract and acquire the receipt ID from the print control data (step SF2). As described above, the receipt ID is identification information uniquely identifying a particular receipt, and is included in the receipt information recorded on the receipt that is produced based on the print control data.

Next, the management server controller 40 accesses the print control data manager database 421 stored on the management server storage 42 and creates a record in the database as described below (step SF3).

Each record in the print control data manager database 421 relationally stores a receipt ID with the print control data.

In step SF3, the management server controller 40 creates a record in the print control data manager database 421, and relationally stores in that record the receipt ID acquired in step SF2 and the print control data received in step SF1.

The operation of the terminal 16 and the management server 15 when the customer selects either button B2 or button B3 on the preview screen G1 is described next.

Figure 6:
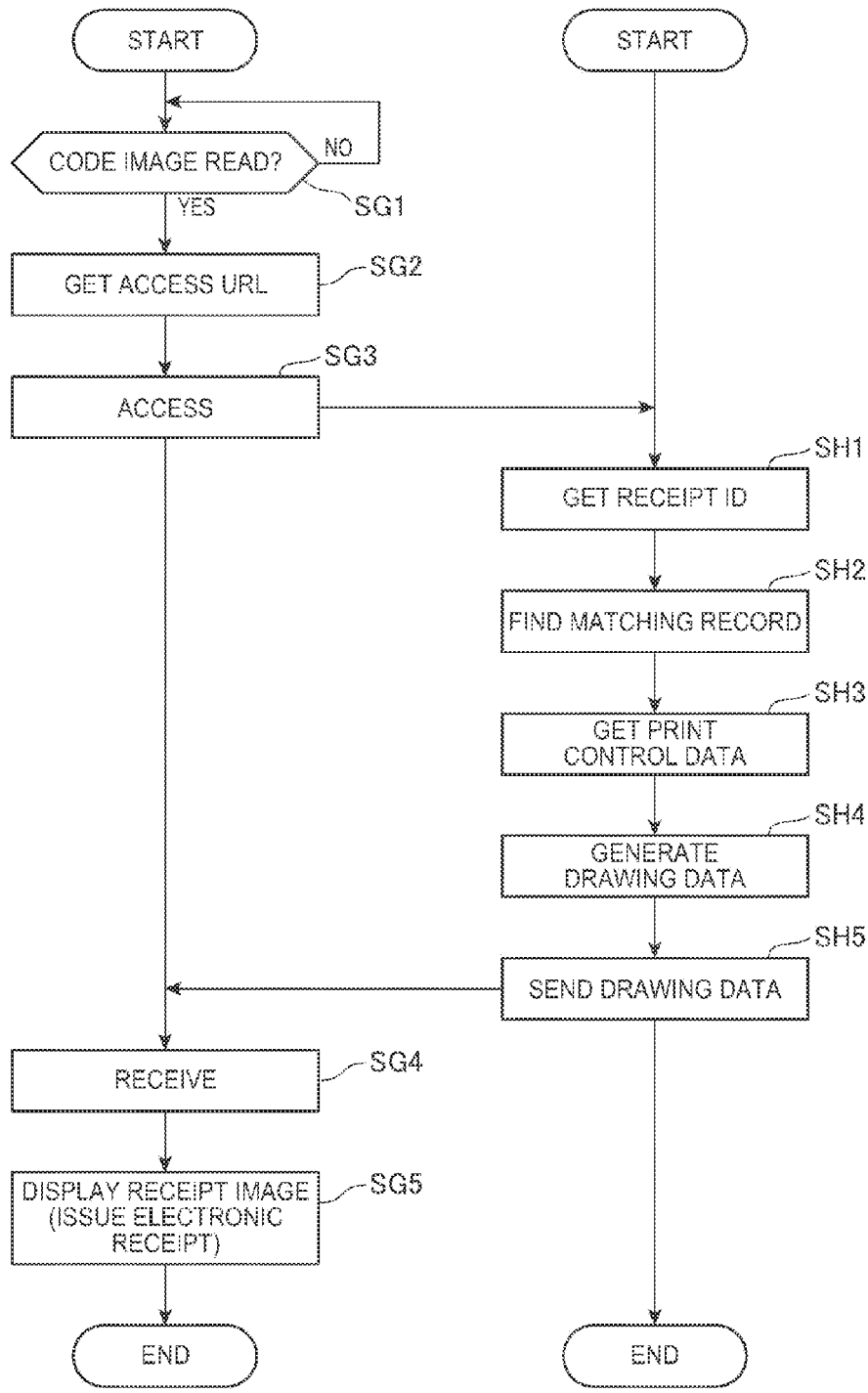
FIGS. 6(A) and 6(B) are flow charts of the operation of a terminal and management server.

FIG. 6 is a flow chart of the operation of the terminal 16 and the management server 15 when the customer selects either button B2 or button B3 on the preview screen G1, column (A) showing the operation of the terminal 16, and (B) showing the operation of the management server 15.

When button B2 or button B3 on the preview screen G1 is operated, the tablet terminal application execution unit 201 of the tablet terminal 13 changes the screen presented on the tablet terminal touch panel 21 from the preview screen G1 to a 2D code preview screen G2.

Figure 7:
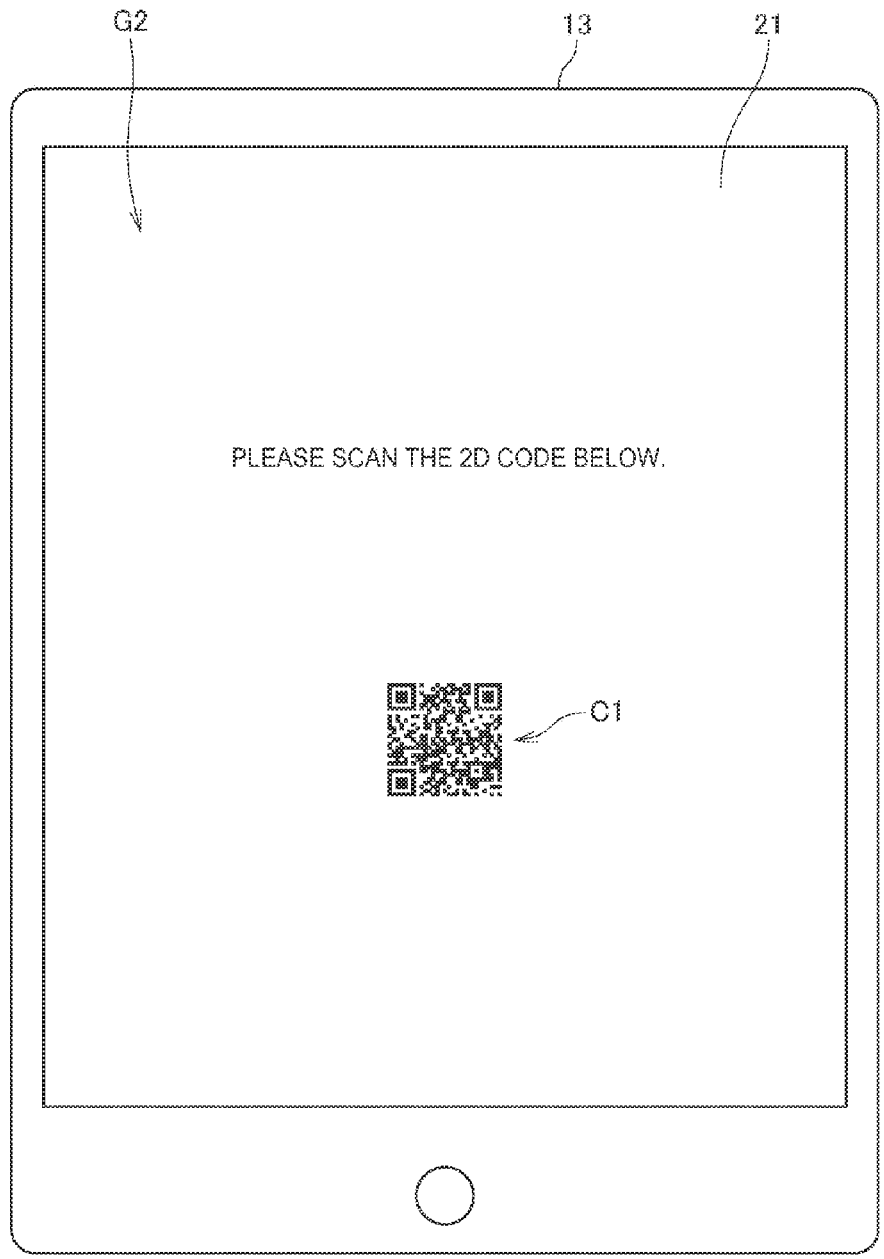
FIG. 7 shows an example of a 2D code display screen.

FIG. 7 shows an example of the 2D code preview screen G2.

As shown in FIG. 7, the 2D code preview screen G2 displays a 2D code image C1 of the 2D code, and a prompt for the user to read the 2D code image C1.

The 2D code image C1 is an image of a 2D code storing a URL to access. This access URL is a URL containing the receipt ID of the receipt produced based on the print control data as a URL query parameter added to a specific URL of the management server.

The tablet terminal application execution unit 201 displays the 2D code preview screen G2 as described below.

That is, the tablet terminal application execution unit 201 acquires a specific URL of the management server 15. This specific URL of the management server 15 is previously registered by a specific method and stored in a specific storage area. Next, the tablet terminal application execution unit 201 adds a parameter name identifying the receipt ID, and the receipt ID as the parameter value, to this specific URL of the management server 15 as a URL query parameter, creating the access URL. Next, the tablet terminal application execution unit 201 generates image data for a 2D code recording the access URL. Note that the tablet terminal application TAP has a function for generating image data of a 2D code expressing specific information based on the specific information. Next, based on the generated image data, the tablet terminal application execution unit 201 displays a 2D code preview screen G2 showing the 2D code image C1 at a specific position.

After starting a terminal application AP on the terminal 16, the customer that selected either button B2 or button B3 takes a picture of the 2D code image C1 on the 2D code preview screen G2 with the camera 54.

As shown in FIG. 6 (A), the terminal application execution unit 501 of the terminal controller 50 of the terminal 16 analyzes the picture image data input from the camera 54 at a specific period and determines if image data for the 2D code symbol is contained in the picture image data (step SG1).

If image data for the 2D code symbol is contained in the picture image data (step SG1: YES), the terminal application execution unit 501 executes the following process (step SG2). Note that below the image data for the 2D code symbol contained in the picture image data is image data based on the 2D code image C1.

In step SG2, the terminal application execution unit 501 analyzes the image data for the 2D code symbol contained in the picture image data, and acquires the access URL represented by the 2D code. As described above, this access URL is information adding the receipt ID as a URL query parameter to a specific URL of the management server 15.

Next, the terminal application execution unit 501 accesses the access URL acquired in step SG2 (step SG3).

As shown in FIG. 6 (B), the control server controller 40 of the management server 15 acquires the receipt ID added as a URL query parameter as a result of the terminal 16 accessing the access URL (step SH1).

Next, the management server controller 40 accesses the transaction information manager database 421 stored in the management server storage 42, and retrieves the record containing the receipt ID acquired in step SH1 from among the records in the database (step SH2).

Next, the management server controller 40 acquires the print control data from the record found in step SH2 (step SH3).

Next, based on the acquired print control data, the management server controller 40 generates drawing data for displaying an image of the receipt that is printed in a specific format based on the print control data (step SH4).

Next, the management server controller 40 controls the management server global network communication interface 41 to send the generated drawing data to the terminal 16 (step SH5).

As shown in FIG. 6 (A), the terminal application execution unit 501 of the terminal 16 controls the terminal global network communication interface 52 to receive the drawing data (step SG4).

Next, the terminal application execution unit 501 displays an image of the receipt on the terminal touch panel 51 based on the drawing data (step SG5).

Displaying an image of the receipt on the terminal touch panel 51 is equivalent to producing an electronic receipt.

The customer can get the transaction-related information by reading the receipt image displayed on the terminal touch panel 51.

The drawing data is also stored in a specific storage area of the terminal 16 relationally to specific meta data (such as the date and time the drawing data was received) by a function of the terminal application AP. Using a specific user interface provided by a function of the terminal application AP, the customer can then use the meta data to select specific drawing data from among the stored drawing data, and display an image of the receipt based on the selected drawing data. As a result, the customer can reference the image for a desired receipt when desired.

The operation of devices in the control system 1 is described above, but the tablet terminal 13, management server 15, and recording device 12 can also execute the processes described below.

For example, when print control data (print control data after data shaping if shaping is applied) is received from the tablet terminal 13, the control server controller 40 of the management server 15 may execute the process described below.

More specifically, the control server controller 40 analyzes the print control data to determine if a condition for printing a coupon is met. Conditions for printing a coupon may include, for example, the total amount of the transaction exceeding a specific value, or a specific product being included in the purchase.

If a condition for printing a coupon is met, the control server controller 40 generates control data ("coupon printing control data") causing the recording device 12 to print a coupon appropriate to the condition that was satisfied.

Next, the management server controller 40 sends the resulting coupon printing control data to the tablet terminal 13.

The tablet terminal application execution unit 201 of the tablet terminal 13 then receives the coupon printing control data. The process of receiving the coupon printing control data is equivalent to a process of receiving a request to print a coupon from the management server 15.

Next, the tablet terminal application execution unit 201 sends the received coupon printing control data to the recording device 12.

The recording device controller 30 of the recording device 12 then receives the coupon printing control data, and controls the recording unit 31 based on the received coupon printing control data to produce a coupon. The coupon produced by the recording device 12 is then given to the customer.

As a result of the tablet terminal 13, management server 15, and recording device 12 executing this process, a coupon appropriate to the transaction is issued and the customer can receive a coupon appropriate to the transaction.

More particularly, a service providing coupons using a function of the tablet terminal 13 and a function of the management server 15 can be provided by simply constructing the POS system S without modifying the POS terminal 10 or the recording device 12.

As described above, a tablet terminal 13 (control device) according to this embodiment has a tablet terminal wireless communication interface 25 (first communication interface) that communicates with a recording device 12 configured to produces receipts based on print control data; a tablet terminal global network communication interface 24 (second communication interface) that communicates through a global network GN with a management server 15 (management device) configured to execute a specific process based on print control data; and a tablet terminal local area network communication interface 23 (third communication interface) that communicates with a POS terminal 10 through a local area network LN.

The tablet terminal 13 has a tablet terminal controller 20 (controller) that returns a substitute address indicating the address of the tablet terminal 13 to the POS terminal 10 when a command asking for the address of the recording device 12 is received from the POS terminal 10; determines whether to send the received print control data to the recording device or the management device, or to both, as the destination device when print control data transmitted by the POS terminal 10 to the substitute address is received; and transmits the print control data to the selected destination.

Thus comprised, print control data transmitted by the POS terminal 10 can be sent to the management server 15 as needed while minimizing changes to an existing POS system comprising a POS terminal 10 and a recording device 12.

In this embodiment of the disclosure, the tablet terminal controller 20 determines the destination to which to send the print control data based on command input to a tablet terminal touch panel 21 (input unit) selecting the destination of the print control data.

Thus comprised, the user (customer) can change the destination of the print control data to the desired device.

When print control data is received from the POS terminal 10 in this embodiment of the disclosure, the tablet terminal controller 20 displays an image of the receipt to be printed based on the print control data on a tablet terminal touch panel 21.

Thus comprised, when a paper receipt was printed, the user (customer) can determine the device to which the print control data is sent after confirming the content of the image recorded on a receipt.

In addition, when the print control data is sent to the management server 15 and the print control data is not data that can be processed by the management server 15 (is not data in a compatible command language), the tablet terminal controller 20 in this embodiment of the disclosure converts the print control data to data that can be processed by the management server 15 based on information identifying the command language of the recording device 12 (information related to the recording device 12), and sends the converted print control data to the management server 15.

Thus comprised, when print control data is sent to the management server 15, the management server 15 can be assured of being able to process the received print control data.

The tablet terminal controller 20 in this embodiment also communicates with the recording device 12 and manages the status of the recording device 12, and when a command sent by the POS terminal 10 to the substitute address requesting the status of the recording device 12 is received, returns the status of the recording device 12 based on the status of the managed recording device 12.

Thus comprised, the POS terminal 10 can quickly acquire the status of the recording device 12.

When the tablet terminal controller 20 in this embodiment sends print control data to the management server 15, and receives a request from the management server 15 to produce a coupon after sending the print control data to the management server 15, the tablet terminal controller 20 may also control the recording device 12 to print a coupon.

Thus comprised, a function of the management server 15 can be used to issue a coupon appropriate to the transaction.

Furthermore, after receiving print control data, the tablet terminal controller 20 in this embodiment of the disclosure reports to the POS terminal 10 that printing a receipt based on the print control data was completed whether or not the print control data was sent to the recording device 12.

Thus comprised, changes to the POS terminal 10 can be minimized without affecting the process of the POS terminal 10 in an existing POS system whereby the POS terminal 10, after outputting print control data, receives a report that printing a receipt was completed and enters a standby mode.

The disclosure is described above with reference to a preferred embodiment thereof, but the disclosure is not limited thereto and can be modified and adapted in many ways without departing from the scope of the accompanying claims.

For example, the recording device 12 in the foregoing embodiment uses a thermal printing method, but the printing method of the recording device 12 is not so limited.

In another example, the tablet terminal application execution unit 201 of the tablet terminal 13 sends a recording completion report to the POS terminal 10 in response to receiving print control data, and discards recording completion reports received from the recording device 12. However, when printing a paper receipt is selected (when button B1 or button B3 is pushed), instead of the tablet terminal 13 sending the recording completion report to the POS terminal 10 when print control data is received, the tablet terminal 13 may wait to receive a recording completion report from the recording device 12 before sending the recording completion report to the POS terminal 10. However, when issuing only an electronic receipt is selected (when button B2 is pushed), the tablet terminal 13 sends a recording completion report to the POS terminal 10 when the print control data is received.

The function blocks described above with reference to the figures can be embodied as desired by the cooperation of hardware and software, and do not suggest a specific hardware configuration.

The disclosure being thus described, it will be apparent to one skilled in the art that it may be varied in many ways. Such variations are not to be regarded as a departure from the spirit and scope of the invention; rather, any such variation is intended to be included within the scope of the following claims.

What is claimed is:

1. A control device comprising:
a user interface configured to receive command input;
a first communication interface configured to communicate with a recording device that is configured to produce a receipt based on print control data from a POS terminal;
a second communication interface configured to communicate through a global network with a management device that executes a specific process based on the print control data;
a third communication interface configured to communicate with the POS terminal through a local area network and receive the print control data; and
a controller configured to:
return a first address of the control device to the POS terminal in response to a command requesting a second address of the recording device from the POS terminal in a state in which the recording device is set to stop sending the second address to the POS terminal, the first address being a substitute address of the second address,
determined to send the received print control data from the first communication interface to the recording device, or from the second communication interface to the management device, based on the command input, which selects a destination of the print control data, in response to the third communication interface receiving the print control data from the POS terminal to the substitute address, and
transmit the print control data to the selected destination.

2. The control device described in claim 1, further comprising:

a display configured to display images of the receipt and first and second buttons, the display being different from a POS terminal display included in the POS terminal;
the controller displaying the image of the receipt to be printed based on the print control data on the display in response to the print control data being received from the POS terminal, and sending the print control data to the recording device M response to a touch of the image of the first button, or to the management device in response to a touch of the image of the second button.

3. The control device described in claim 1, further comprising:
a storage configured to store information related to the recording device;
the controller
converting the print control data to converted print control data that is configured to be processed by the management device based on information related to the recording device if the print control data is sent to the management device and the print control data is not data that is configured to be processed by the management device, and
sending the converted print control data to the management device.

4. The control device described in claim 1, wherein:
the controller communicates with the recording device and manages a status of the recording device, and
returns the status of the recording device based on a status of the managed recording device if the third communication interface receives a command sent by the POS terminal to the substitute address requesting the status of the recording device.

5. The control device described in claim 1, wherein:
if the controller sends the print control data to the management device, and receives a request from the management device to produce a coupon after sending the print control data to the management device, the controller controls the recording device to print a coupon.

6. The control device described in claim 1, wherein:
after receiving the print control data, the controller reports to the POS terminal that printing a receipt based on the print control data was completed whether or not the print control data was sent to the recording device.

7. The control device described in claim 1, wherein the first communication interface is connected to open a direct 1:1 wireless data communication link with the recording device.

8. A control system comprising:
a POS terminal configured to execute a transaction process;
a recording device configured to produce a receipt based on print control data from a POS terminal;
a management device configured to execute a specific process based on the print control data; and
a control device configured to communicate with the POS terminal, the recording device, and the management device;
the control device including:
a user interface configured to receive command input,
a first communication interface configured to communicate with the recording device,
a second communication interface configured to communicate through a global network with the management device, a third communication interface configured to communicate with the POS terminal through a local area network and receive the print control data, and a controller configured to:
return a first address of the control device to the POS terminal in response to a command requesting a second address of the recording device from the POS terminal in a state in which the recording device is set to stop sending the second address to the POS terminal, the first address being a substitute address of the second address, determine to send the received print control data from the first communication interface to the recording device, or from the second communication interface to the management device, based on the command input, which selects a destination of the print control data, in response to the third communication interface receiving the print control data from the POS terminal to the substitute address, and transmit the print control data to the selected destination.

9. The control system described in claim 8, wherein:
the control device has a display configured to display images of the receipt and first and second buttons, the display being different from a POS terminal display included in the POS terminal; and the controller of the control device displays the image of the receipt to be printed based on the print control data on the display in response to the third communication interface receiving the print control data from the POS terminal, and sending the print control data to the recording device in response to a touch of the image of the first button, or to the management device in response to a touch of the image of the second button.

10. The control system described in claim 8, wherein:
the control device has a storage configured to store information related to the recording device; and the controller of the control device converts the print control data to data that is configured to be processed by the management device based on information related to the recording device if the print control data is sent to the management device and the print control data is not data that is configured to be processed by the management device, and sends the converted print control data to the management device.

11. The control system described in claim 8, wherein:
the controller of the control device communicates with the recording device and manages the status of the recording device, and returns the status of the recording device based on the status of the managed recording device if the third communication interface receives a command sent by the POS terminal to the substitute address requesting status of the recording device.

12. The control system described in claim 8, wherein:
if the controller sends the print control data to the management device, and receives a request from the management device to produce a coupon after sending the print control data to the management device, the controller of the control device controls the recording device to print a coupon.

13. The control system described in claim 8, wherein:
after receiving the print control data, the controller of the control device reports to the POS terminal that printing a receipt based on the print control data is completed whether or not the print control data is sent to the recording device.

14. The control system described in claim 8, wherein the first communication interface is connected to open a direct 1:1 wireless data communication link with the recording device.

15. A control method of a control device, the method comprising:
returning, by a processor of the control device, a first address of the control device to a POS terminal through a LAN in response to a command requesting a second address of a recording device that is configured to produce a receipt based on print control data from the POS terminal in a state in which the recording device is set to stop sending the second address to the POS terminal, the first address being a substitute address of the second address;

determining, by the processor, to send the received print control data to at least one of the recording device and a management device, which communicates through a global network and executes a specific process based on the print control data, based on a command input, which selects a destination of the print control data, if the control device receives the print control data from the POS terminal to the substitute address; and transmitting, by the processor, the print control data to the selected destination.

16. The control method of the control device described in claim 15, further comprising:
displaying, by the processor, image of the receipt and first and second buttons, the image of the receipt being displayed based on the print control data in response to the print control data being received by the control device from the POS terminal; and sending, by the processor, the print control data to the recording device in response to a touch of the image of the first button, or to the management device in response to a touch of the image of the second button.

17. The control method of the control device described in claim 15, further comprising:
converting, by the processor, the print control data to converted data that is configured to be processed by the management device based on information related to the recording device if the print control data is sent to the management device and the print control data is not data that is configured to be processed by the management device, and sending, by the processor, the converted print control data to the management device.

18. The control method of the control device described in claim 15, further comprising:
communicating, by the processor, with the recording device and managing status of the recording device; and returning, by the processor, the status of the recording device based on status of the managed recording device if the control device receives a command sent by the POS terminal to the substitute address requesting the status of the recording device.

19. The control method of the control device described in claim 15, further comprising:
controlling, by the processor, the recording device to print a coupon if the print control data is sent to the management device, and a request is received from the management device to produce a coupon after the print control data is sent to the management device.

20. The control method of the control device described in claim 15, further comprising:

reporting, by the processor, to the POS terminal that printing a receipt based on the print control data is completed after the print control data is received whether or not the print control data is sent to the recording device.

\* \* \* \* \*